United States Patent
Li et al.

(10) Patent No.: US 7,809,185 B2
(45) Date of Patent: Oct. 5, 2010

(54) EXTRACTING DOMINANT COLORS FROM IMAGES USING CLASSIFICATION TECHNIQUES

(75) Inventors: Mingjing Li, Beijing (CN); Wei-Ying Ma, Beijing (CN); Zhiwei Li, Beijing (CN); Yuanhao Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1048 days.

(21) Appl. No.: 11/533,953

(22) Filed: Sep. 21, 2006

(65) Prior Publication Data

US 2008/0075360 A1 Mar. 27, 2008

(51) Int. Cl.
*G06K 9/62* (2006.01)
(52) U.S. Cl. .................... 382/155; 382/162; 382/190
(58) Field of Classification Search .......... 382/155, 382/118, 101, 124, 144, 156
See application file for complete search history.

(56) References Cited

U.S. PATENT DOCUMENTS

| | | | |
|---|---|---|---|
| 5,222,154 A | | 6/1993 | Graham et al. |
| 6,185,314 B1* | | 2/2001 | Crabtree et al. ............ 382/103 |
| 6,487,554 B2* | | 11/2002 | Ganapathy et al. ............ 707/6 |
| 6,766,056 B1 | | 7/2004 | Huang et al. |
| 7,079,683 B2 | | 7/2006 | Kim et al. |
| 2004/0197021 A1 | | 10/2004 | Huang et al. |
| 2005/0008222 A1 | | 1/2005 | Gallina |
| 2005/0093880 A1 | | 5/2005 | Kim |
| 2005/0270383 A1 | | 12/2005 | Hung |
| 2006/0077468 A1 | | 4/2006 | Loce et al. |

FOREIGN PATENT DOCUMENTS

WO    WO2006003602    1/2006

OTHER PUBLICATIONS

Deng, Yining et al., "An Efficient Color Representation for Image Retrieval," IEEE Transactions on Image Processing, vol. 10, No. 1, Jan. 2001, © 2001 IEEE, pp. 140-147.
Friedman, Jerome, Trevor Hastie and Robert Tibshirani, "Additive Logistic Regression: a Statistical View of Boosting," Aug. 20, 1998, Stanford University Technical Report, pp. 1-45.
Itti, Laurent and Christof Koch, "Feature combination strategies for saliency-based visual attention systems," Journal of Electronic Imaging, Jan. 2001, vol. 10(1), © 2001 SPIE and IS&T, pp. 161-169.

(Continued)

*Primary Examiner*—Samir A. Ahmed
*Assistant Examiner*—Ruiping Li
(74) *Attorney, Agent, or Firm*—Perkins Coie LLP

(57) ABSTRACT

A method and system for generating a detector to detect a dominant color of an image is provided. A dominant color system trains a detector to classify colors as being dominant colors of images. The dominant color system trains the detector using a collection of training images. To train the detector, the dominant color system first identifies candidate dominant colors of the training images. The dominant color system then extracts features of the candidate dominant colors. The dominant color system also inputs an indication of dominance of each of the candidate dominant colors. The dominant color system then trains a detector to detect the dominant color of images using the extracted features and indications of dominance of the candidate dominant colors as training data.

14 Claims, 13 Drawing Sheets

OTHER PUBLICATIONS

Itti, Laurent, Christof and Ernst Niebur, "A Model of Saliency-based Visual Attention for Rapid Scene Analysis," IEEE Transactions on Pattern Analysis and Machine Intelligence, 20(11), Nov. 1998, pp. 1254-1259.

Luo, M. R., G. Cui and B. Rigg, "The Development of the CIE 2000 Colour-Difference Formula: CIEDE2000," Color research and application, vol. 26, No. 5, Oct. 2001, pp. 340-350.

Ma, Yu-Fei and Hong-Jiang Zhang, "Contrast-based Image Attention Analysis by Using Fuzzy Growing," MM'03, Nov. 2003, Berkeley, California, © 2003 ACM, pp. 374-381.

Smith, John R. and Shih-Fu Chang, "Automated Image Retrieval Using Color and Texture," Columbia University Technical Report TR# 414-95-20, Jul. 1995, http://www.ee.columbia.edu/~jrsmith/html/pubs/PAMI/pami_final_1.html, [last accessed Jul. 24, 2006].

Wan, Xia and C. C. Jay Kuo, "A New Approach to Image Retrieval with Hierarchical Color Clustering," IEEE Transactions on Circuits and Systems for Video Technology, vol. 8, No. 5, Sep. 1998, © 1998 IEEE, pp. 628-643.

Wong, Ka-Man et al., "Dominant Color Image Retrieval using Merged Histogram," Proceedings of the International Symposium on Circuits and Systems, vol. 2, May 2003, © 2003 IEEE, pp. II-908-II-911.

* cited by examiner

EXTRACTING DOMINANT COLORS FROM IMAGES USING CLASSIFICATION TECHNIQUES

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

The Internet is being increasingly used to search for and view images (e.g., photographs). To support this use, commercial search engine services have located and indexed over 1 billion images since 2005. The indexing techniques for images of web pages typically work in a similar manner to the indexing of web pages. Once a search engine service identifies an image, it attempts to identify keywords related to that image from text surrounding the image on the web page that contains the image or from text surrounding links on other web pages that reference the web page that contains the image. The search engine service then creates a mapping from those keywords to the image. A user can then submit a textual query when searching for an image. For example, a user who is interested in locating images relating to a tiger may submit the query "tiger animal." The search engine service may then search the keyword indexes for the keywords "tiger" and "animal" to locate the related images. The search engine service displays a thumbnail of each related image as the search result.

To help improve searching for images, content-based image retrieval techniques have been used. Some content-based image retrieval techniques use low-level features such as color, texture, and sharpness to represent the images. Such low-level features, however, do not effectively represent the semantics of images. Some content-based image retrieval techniques use mid-level features such as dominant color and type of image (e.g., photograph or graphic) to represent images. Theses mid-level features tend to provide more semantic information than the low-level features and are thus more useful when searching for images.

The dominant colors of images can be used by search engine services in different ways to improve the search experience. For example, a search engine service may allow a user to input the dominant color as a visual feature of desired images along with keywords expressing the semantics of desired images. Thus, a query might consist of the keywords "Tiger Woods" and the dominant color of "green." As another example, a search engine service may identify images that match keywords of a query and then cluster the identified images based on their dominant colors. To facilitate the use of dominant color, a search engine service may index its images based on the dominant color of the images.

The dominant color of images can also be used in applications outside of searching. Systems that display images on a computer display or television may automatically generate a matte that surrounds each image. Such systems may select a color for the matte based on the dominant color. For example, the color selected for the matte may be a color that is complementary to the dominant color of the image. Other systems generate ambient light while an image or a video is being displayed. Such systems may select a color for the ambient light that is based on the dominant color of the image or the frame of video currently being displayed.

Current techniques for identifying the dominant color of an image typically select the color that appears most frequently in an image or apply some statistical algorithm. The current techniques, however, do not always identify the appropriate color as the dominant color. For example, if an image has 25 percent of its pixels in one color and 75 percent in very similar colors (that are very different from the first color), but has no more than 5 percent in any one similar color, current techniques may incorrectly select the color of the 25 percent of the pixels as the dominant color.

SUMMARY

A method and system for generating a detector to detect a dominant color of an image is provided. A dominant color system trains a detector to classify colors as being dominant colors of images. The dominant color system trains the detector using a collection of training images. To train the detector, the dominant color system first identifies candidate dominant colors of the training images. The dominant color system then extracts features of the candidate dominant colors. Some of the extracted features of a candidate dominant color may be based on the difference between the candidate dominant color and colors within certain areas of the image. The dominant color system also inputs an indication of dominance of each of the candidate dominant colors. The dominant color system then trains a detector to detect the dominant color of images using the extracted features and indications of dominance of the candidate dominant colors as training data. The dominant color system may train the detector based on various classification techniques. Once the detector is trained, the detector can be used by various applications to identify the dominant color of a target image. To identify the dominant color, the application identifies candidate dominant colors of the target image using the same techniques for identifying the candidate dominant colors of the training images. The application then extracts features for the candidate dominant colors again using the same techniques for extracting features of the candidate dominant colors of the training images. The application then applies the detector to the extracted features for each candidate dominant color to generate a score indicating dominance of the candidate dominant color to the target image. The application then can select the candidate dominant color with the highest score as the dominant color for the target image.

This Summary is provided to introduce a selection of concepts in a simplified form that are further described below in the Detailed Description. This Summary is not intended to identify key features or essential features of the claimed sub-

DETAILED DESCRIPTION

Figure 1:
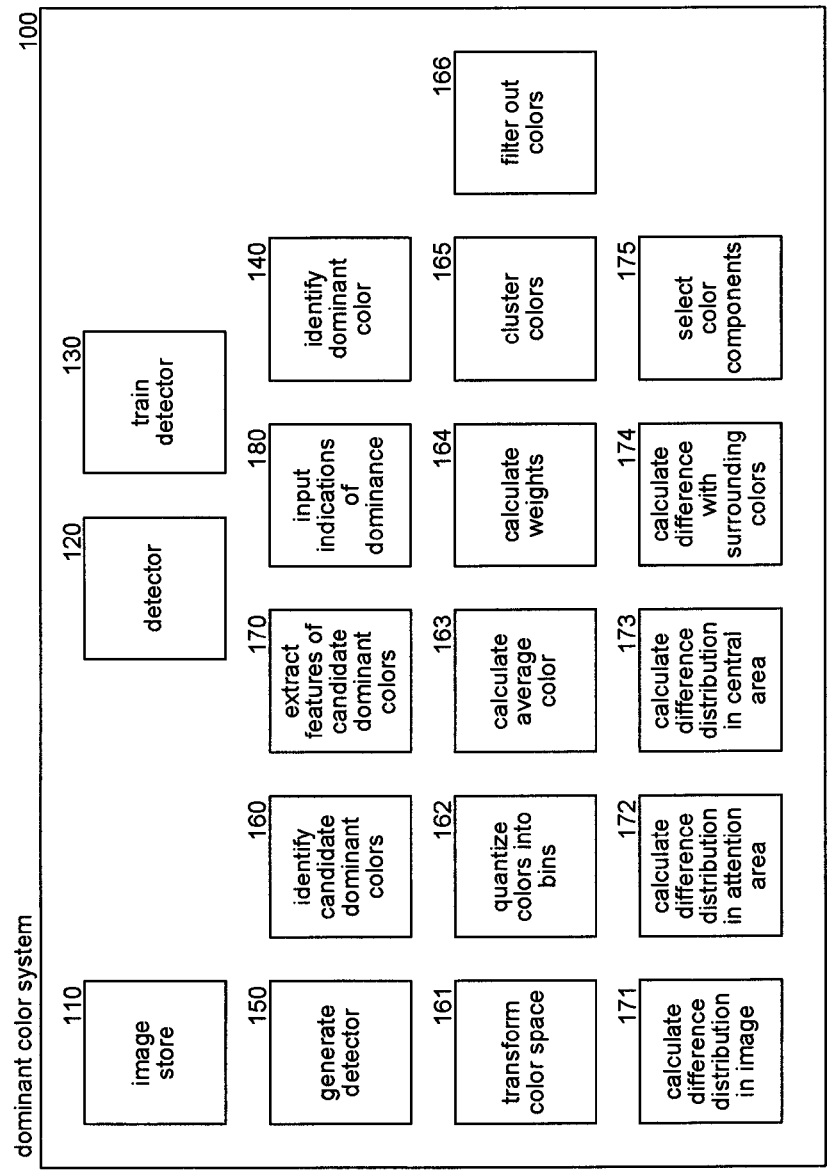
FIG. 1 is a block diagram that illustrates components of the dominant color system in one embodiment.

A method and system for generating a detector to detect a dominant color of an image is provided. In one embodiment, a dominant color system trains a detector to classify colors as being dominant colors of images. The dominant color system trains the detector using a collection of training images. For example, the training images may be a subset of images indexed by a search engine service. To train the detector, the dominant color system first identifies candidate dominant colors of the training images. The dominant color system may use conventional techniques for identifying candidate dominant colors, such as selecting the colors with highest frequencies, or may use clustering techniques as described below. The dominant color system then extracts features of the candidate dominant colors. Some of the extracted features of a candidate dominant color may be based on the difference between the candidate dominant color and colors within certain areas of the image. For example, one extracted feature may be based on differences between the candidate dominant color and the colors associated with an attention area within the image. The dominant color system also inputs an indication of dominance of each of the candidate dominant colors. The indications may be binary values (i.e., dominant or not dominant), other discrete values (e.g., extreme, high, normal, and low), or continuous values (e.g., a real value between 0 and 1). The indications of dominance may be input from the people who review the training images and provide their opinion of the dominance of the candidate dominant colors. The dominant color system then trains a detector to detect the dominant color of images using the extracted features and indications of dominance of the candidate dominant colors as training data. The dominant color system may train the detector based on various classification techniques, such as support vector machines ("SVM"), adaptive boosting, and neural networks. Once the detector is trained, the detector can be used by various applications to identify the dominant color of a target image. To identify the dominant color, the application identifies candidate dominant colors of the target image using the same techniques for identifying the candidate dominant colors of the training images. The application then extracts features for the candidate dominant colors again using the same techniques for extracting features of the candidate dominant colors of the training images. The application then applies the detector to the extracted features for each candidate dominant color to generate a score indicating dominance of the candidate dominant color to the target image. The application then can select the candidate dominant color with the highest score as the dominant color for the target image. In this way, the dominant color of an image can be identified based on learning from training data which features of candidate dominant colors most indicate dominance of a color.

In one embodiment, the dominant color system identifies candidate dominant colors of an image by quantizing the colors of the image into bins, calculating representative colors of the bins, calculating a weight for the bins, clustering the representative colors factoring in the weights, and then filtering out representative colors whose weights are too low. The dominant color system considers the representative colors remaining after filtering to be the candidate dominant colors of the image. The dominant color system may first convert the colors of an image to a color space that is approximately perceptually uniform so that similarity between colors can be based on a Euclidean distance in the color space. For example, the dominant color system may represent the colors in the CIE L*a*b color space. In such a case, if the colors of the image are in another color space such as RGB, the dominant color system transforms the colors of the image to the CIE L*a*b color space using techniques that are well known in the art. The dominant color system may represent the difference between colors using a Euclidean distance metric as represented by the following equation:

$$\text{ColorDifference} = \sqrt{(L_1-L_2)^2+(a_1-a_2)^2+(b_1-b_2)^2} \quad (1)$$

where L, a, and b represent the components of a color in the CIE L*a*b space.

In one embodiment, the dominant color system quantizes the colors of an image into bins to reduce the computational complexity of identifying the candidate dominant colors. The dominant color system identifies bins based on quantization of the color components. The dominant color system may define the bins according to the following table:

| Color Component | Range | Number of Bins | Bin Threshold |
|---|---|---|---|
| L | 0→100 | 10 | 10, 20, . . . , 90 |
| a | −86.183→98.235 | 19 | −80, −70, . . . , 90 |
| b | −107.865→94.477 | 21 | −100, −90, . . . , 90 |

Thus, the dominant color system defines 3990 bins (i.e., 10×19×21). One skilled in the art will appreciate that different numbers of bins and different thresholds may be used. For example, the bin thresholds may be at intervals of five (e.g., 5, 10, and 15) resulting in approximately eight times as many bins or at intervals of 20 (e.g., 20, 40, and 60) resulting in approximately one-eighth as many bins. The dominant color system adds each color of each pixel of the image to the appropriate bin. For example, the dominant color system adds the color (21, 101, 39) to the bin represented by the thresholds 20, 100, and −30. The dominant color system then calculates a representative color for each bin based on the colors in the bins. The dominant color system may select the average of the colors within a bin as the representative color for the bin. The dominant color system also generates a weight for each representative color that may be initially set to a percentage of the total number of colors that are in the bin. For example, if the image has 160×160 pixels and one bin has 256 pixels, then the weight for the representative color of that bin may be 0.01 (i.e., 256/(160×160)).

In one embodiment, the dominant color system clusters the representative colors and selects the clustered representative colors as the candidate dominant colors. The dominant color system initially considers each representative color to be a cluster of one representative color. The dominant color system successively identifies the pairs of representative colors that are most similar as indicated by the difference metric of Equation 1. The dominant color system then combines the representative colors into a single combined representative color factoring in the weights of the representative colors and then combines their weights into a single combined weight. The dominant color system may combine the representative colors and weights using a linear or nonlinear weighting technique. For example, the dominant color system may linearly combine the representative colors based on the following equation:

$$C_n = \frac{W_i * C_i + W_j * C_j}{W_i + W_j} \quad (2)$$

where $C_i$ represents a color component of the ith representative color and $W_i$ represents the weight of the ith representative color. The dominant color system may linearly combine the weights based on the following equation:

$$W_n = W_i + W_j \quad (3)$$

The dominant color system continues the process of clustering representative colors that are most similar as long as the similarity between the representative colors is below a threshold. The dominant color system may then filter out representative colors whose weights are below a threshold to help ensure that representative colors generated from only a few numbers of pixels are not selected as candidate dominant colors. The dominant color system may use a fixed threshold (e.g., weight less than 0.05) or a dynamic threshold (e.g., filter out 80 percent of the representative colors with the low weights or filter out representative colors with weights less than a certain percentage of the highest weight).

The dominant color system extracts various features of a candidate dominant color to represent characteristics of the color. In one embodiment, the dominant color system uses a 27-element feature vector to represent a candidate dominant color. The dominant color system generates four six-dimension feature elements and one three-dimension feature element (i.e., the color components of the color). The dominant color system identifies feature elements based on the difference between the candidate dominant color and the colors within certain areas of the image. The areas of the image may include the entire image, a central area of the image, and an attention area of the image. The six-dimension feature elements corresponding to these areas are histograms generated from the differences. When generating the histogram for the entire image, the dominant color system calculates the difference between the candidate dominant color and each color of the image. The dominant color system increments the appropriate histogram bin based on the difference. The histogram bins may be evenly distributed between 0 and the maximum difference in the color space or may be distributed nonlinearly. After incrementing a bin for each color of the image, the dominant color system then calculates for each bin the percentage of the total number of pixels of the image that are within that bin and uses the percentages as the values of the six-dimension histogram. The dominant color system generates a histogram for an attention area and a central area in a similar manner. The central area may comprise 25 percent of the pixels of the image that are near the center of the image. The attention area may be an area identified using well-known attention area (e.g., region of interest) identification techniques. See, e.g., Ma, Y. F., Zhang, H. J., "Contrast-Based Image Attention Analysis by Using Fuzzy Growing," ACM Multimedia 2003, Berkeley, Calif., USA, pp. 374-381. The dominant color system may select the attention area that is given the highest score by these techniques.

The dominant color system also extracts a six-dimension feature element based on differences between colors similar to a candidate dominant color and neighboring colors of those similar colors. The dominant color system identifies the colors of an image that are similar to a candidate dominant color. The dominant color system then calculates the difference between that similar color and neighboring similar colors in the image. In one embodiment, the dominant color system defines neighboring colors to be the colors of pixels within a 5×5 area of the pixel of the similar color. The dominant color system creates a six-dimension histogram for each similar color based on the differences between the similar color and its neighboring colors. The dominant color system converts the histogram to percentages. After the dominant color system generates a percentage histogram for each similar color, it generates an average percentage histogram of all the similar colors and uses that average histogram as the feature element for the candidate dominant color.

In one embodiment, the dominant color system generates training data for training the detector by identifying candidate dominant colors for images of a collection and extracting the features for the candidate dominant colors as described above. The dominant color system then inputs for each dominant color an indication of dominance of that color to its image. The extracted features and their indications of dominance represent the training data. The dominant color system then trains the detector to detect the dominant color of images using the training data. The dominant color system may use various techniques for training a classifier to train the detector. The detector may be trained using adaptive boosting techniques, support vector machine techniques, neural network techniques, and so on. After the dominant color system generates the classifier, it can be used by applications to identify the dominant color of images as described above.

Adaptive boosting is an iterative process that runs multiple tests on a collection of training data having examples. Adaptive boosting transforms a weak learning algorithm (an algorithm that performs at a level only slightly better than chance) into a strong learning algorithm (an algorithm that displays a low error rate). The weak learning algorithm may run on different subsets of the training data. The algorithm concentrates more and more on those examples in which its predecessors tended to show mistakes. The algorithm corrects the errors made by earlier weak learning algorithms. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier or ranking function.

A support vector machine operates by finding a hyper-surface in the space of possible inputs. The hyper-surface attempts to split the positive examples (e.g., feature vectors for data tables) from the negative examples (e.g., feature vectors for layout tables) by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.)

A neural network has three major components: architecture, cost function, and search algorithm. The architecture defines the functional form relating the inputs to the outputs (in terms of network topology, unit connectivity, and activation functions). The search in weight space for a set of weights that minimizes the objective function is the training process. A neural network may use a radial basis function ("RBF") network and a standard gradient descent as a search technique.

FIG. 1 is a block diagram that illustrates components of the dominant color system in one embodiment. The dominant color system 100 includes an image store 110, a detector 120, a train detector component 130, an identify dominant color component 140, and a generate detector component 150. The image store contains the training images from which the dominant color system generates the training data. The detector is generated by the train detector component using the training data generated by the generate detector component. The identify dominant color component is used by applications to identify the dominant color of an image. The generate detector component generates the training data using an identify candidate dominant colors component 160, an extract features of candidate dominant colors component 170, and an input indications of dominance component 180. The identify candidate dominant colors component identifies candidate dominant colors using a transform color space component 161, a quantize colors into bins component 162, a calculate average colors component 163, a calculate weights component 164, a cluster colors component 165, and a filter out colors component 166, which are described below in detail. The extract features of candidate dominant colors component extracts features using a calculate difference distribution in image component 171, a calculate difference distribution in attention area component 172, a calculate difference distribution in central area component 173, a calculate difference with surrounding colors component 174, and a select color components component 175, which are described below in detail.

The computing devices on which the dominant color system may be implemented may include a central processing unit, memory, input devices (e.g., keyboard and pointing devices), output devices (e.g., display devices), and storage devices (e.g., disk drives). The memory and storage devices are computer-readable media that may contain instructions and data structures that implement the dominant color system. In addition, the instructions, data structures, and modules of the dominant color system may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the dominant color system may be implemented in various operating environments that include personal computers, server computers, multiprocessor systems, microprocessor-based systems, network PCs, minicomputers, mainframe computers, distributed computing environments that include any of the above systems or devices, and so on.

The dominant color system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the identify dominant color component may be implemented on computing systems separate from the computing system that implements the generate detector component.

Figure 2:
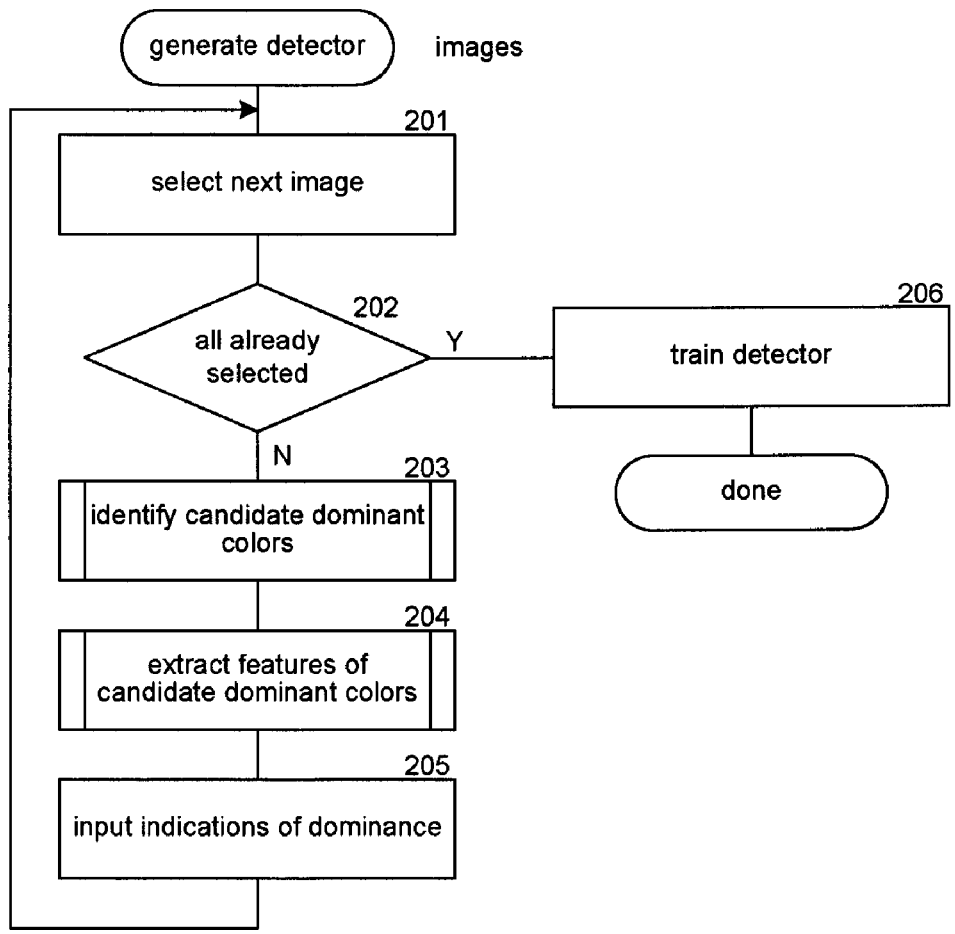
FIG. 2 is a flow diagram that illustrates the processing of the generate detector component of the dominant color system in one embodiment.

FIG. 2 is a flow diagram that illustrates the processing of the generate detector component of the dominant color system in one embodiment. The component is passed training images, generates training data from the images, and trains a detector to detect the dominant color of images. In blocks 201-205, the component loops generating the training data for each training image. In block 201, the component selects the next training image. In decision block 202, if all the training images have already been selected, then the component continues at block 206, else the component continues at block 203. In block 203, the component invokes the identify candidate dominant colors component to identify candidate dominant colors for the selected image. In block 204, the component invokes the extract features of candidate dominant colors component to extract features of the candidate dominant colors of the selected image. In block 205, the component inputs indications of dominance of the candidate dominant colors of the selected image and then loops to block 201 to select the next training image. In block 206, the component trains a detector using the extracted features and indications of dominance and then completes.

Figure 3:
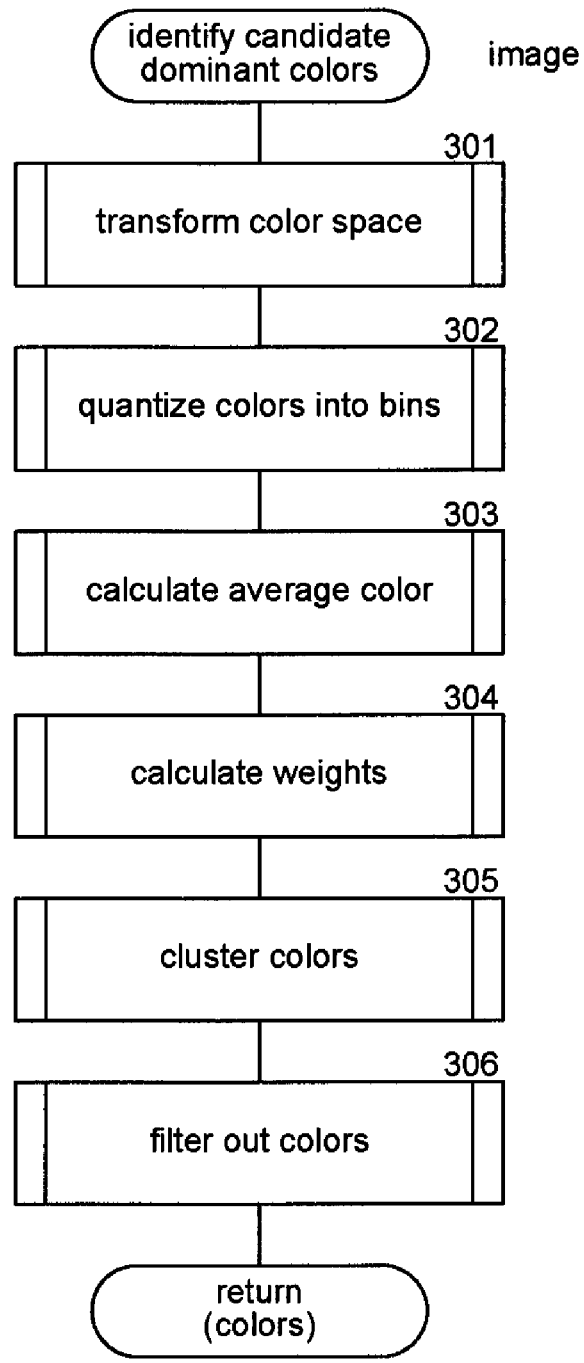
FIG. 3 is a flow diagram that illustrates the processing of the identify candidate dominant colors component of the dominant color system in one embodiment.

FIG. 3 is a flow diagram that illustrates the processing of the identify candidate dominant colors component of the dominant color system in one embodiment. The component is passed an image and identifies candidate dominant colors of the image. In block 301, the component invokes the transform color space component to transform the colors of the passed image into an appropriate color space. One skilled in the art will appreciate that this is an optional step. The dominant color system may use any color space and an appropriate difference metric for that color space so that the differences represent perceptual differences. In block 302, the component invokes the quantize colors into bins component to quantize the colors of the passed image into bins. In block 303, the component invokes the calculate average colors component to calculate a representative color for each bin. In block 304, the component invokes the calculate weights component to calculate a weight for each bin or representative color. In block 305, the component invokes the cluster colors component to cluster the representative colors. In block 306, the component invokes the filter out colors component to filter out representative colors whose weights are too low. The component then returns the representative colors that have not been filtered out as the candidate dominant colors.

Figure 4:
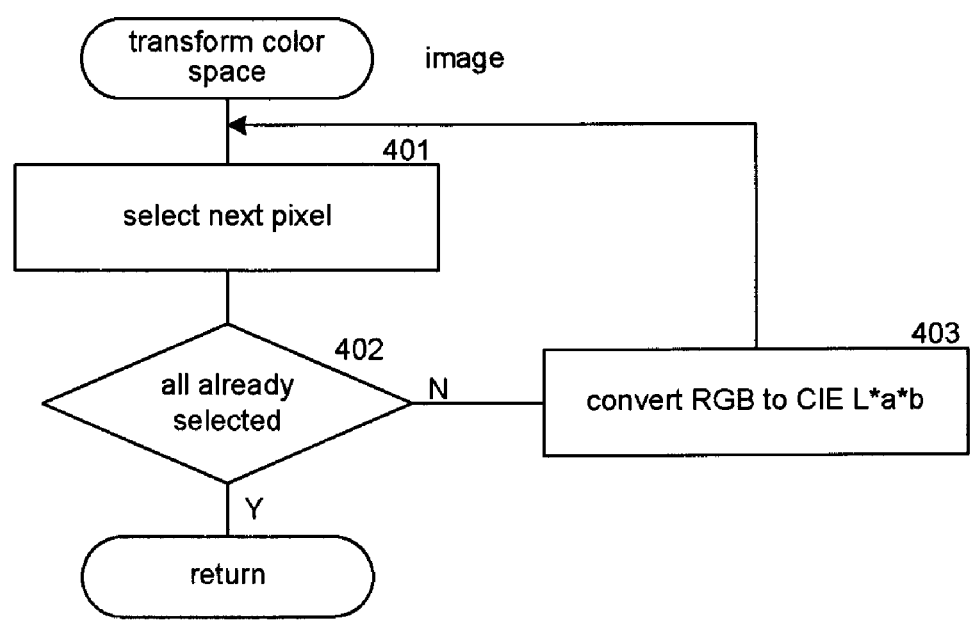
FIG. 4 is a flow diagram that illustrates the processing of the transform color space component of the dominant color system in one embodiment.

FIG. 4 is a flow diagram that illustrates the processing of the transform color space component of the dominant color system in one embodiment. The component is passed an image with colors in RGB color space and transforms the colors to CIE L*a*b color space. In block 401, the component selects the next pixel of the passed image. In decision block 402, if all the pixels have already been selected, then the component returns, else the component continues at block 403. In block 403, the component converts the components of the RGB color to the corresponding components of the CIE L*a*b color. The component then loops to block 401 to select the next pixel of the passed image.

Figure 5:
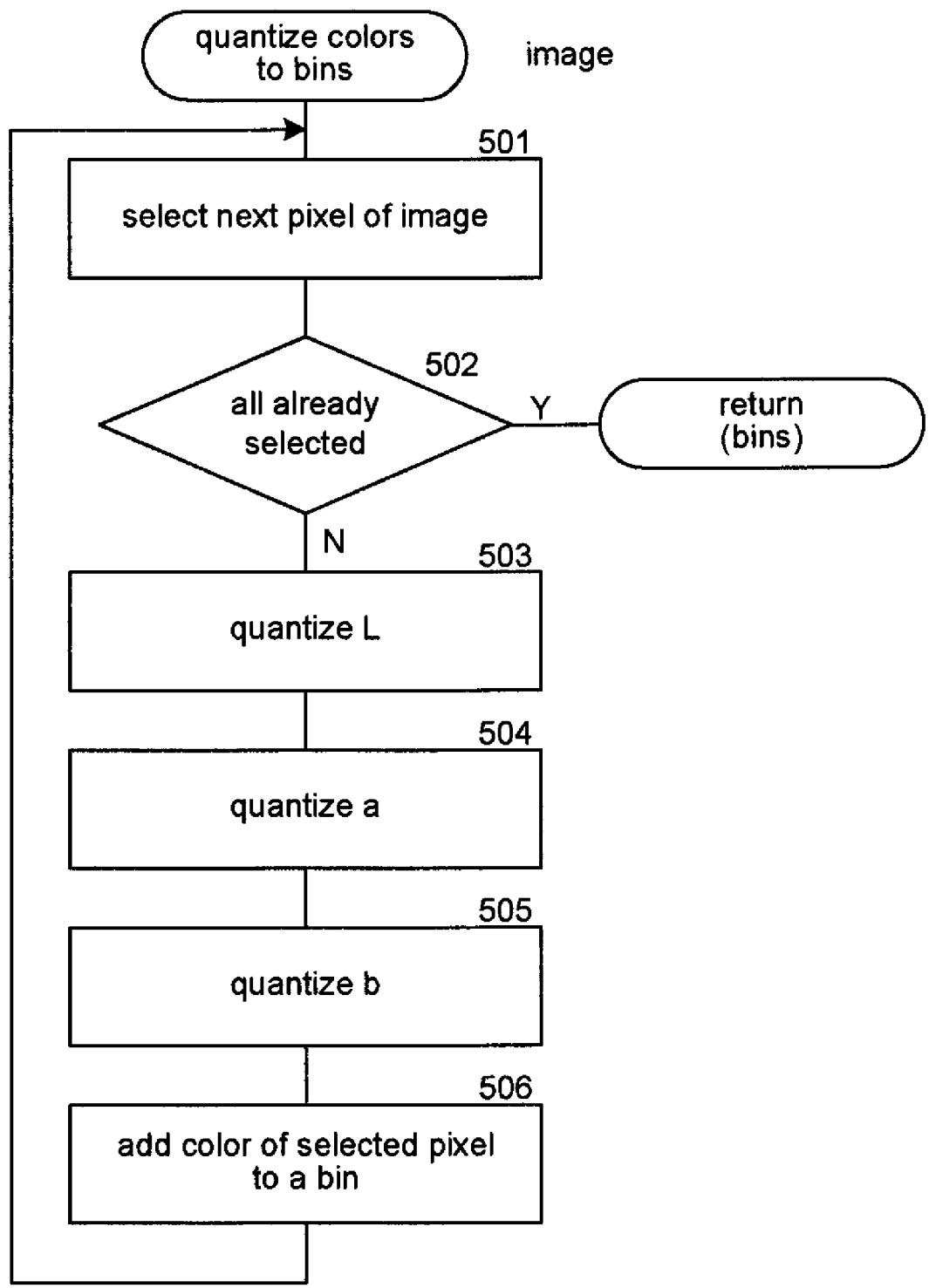
FIG. 5 is a flow diagram that illustrates the processing of the quantize colors into bins component of the dominant color system in one embodiment.

FIG. 5 is a flow diagram that illustrates the processing of the quantize colors into bins component of the dominant color system in one embodiment. The component is passed an image and returns bins that contain the colors of the image. In block 501, the component selects the next pixel of the passed image. In decision block 502, if all the pixels of the passed image have already been selected, then the component returns the bins, else the component continues at block 503. In blocks 503-505, the component quantizes the components of the color of the selected pixel based on the thresholds of the bins. In block 506, the component adds the color of the selected pixel to the bin identified by the quantized components. The component then loops to block 501 to select the next pixel of the passed image.

Figure 6:
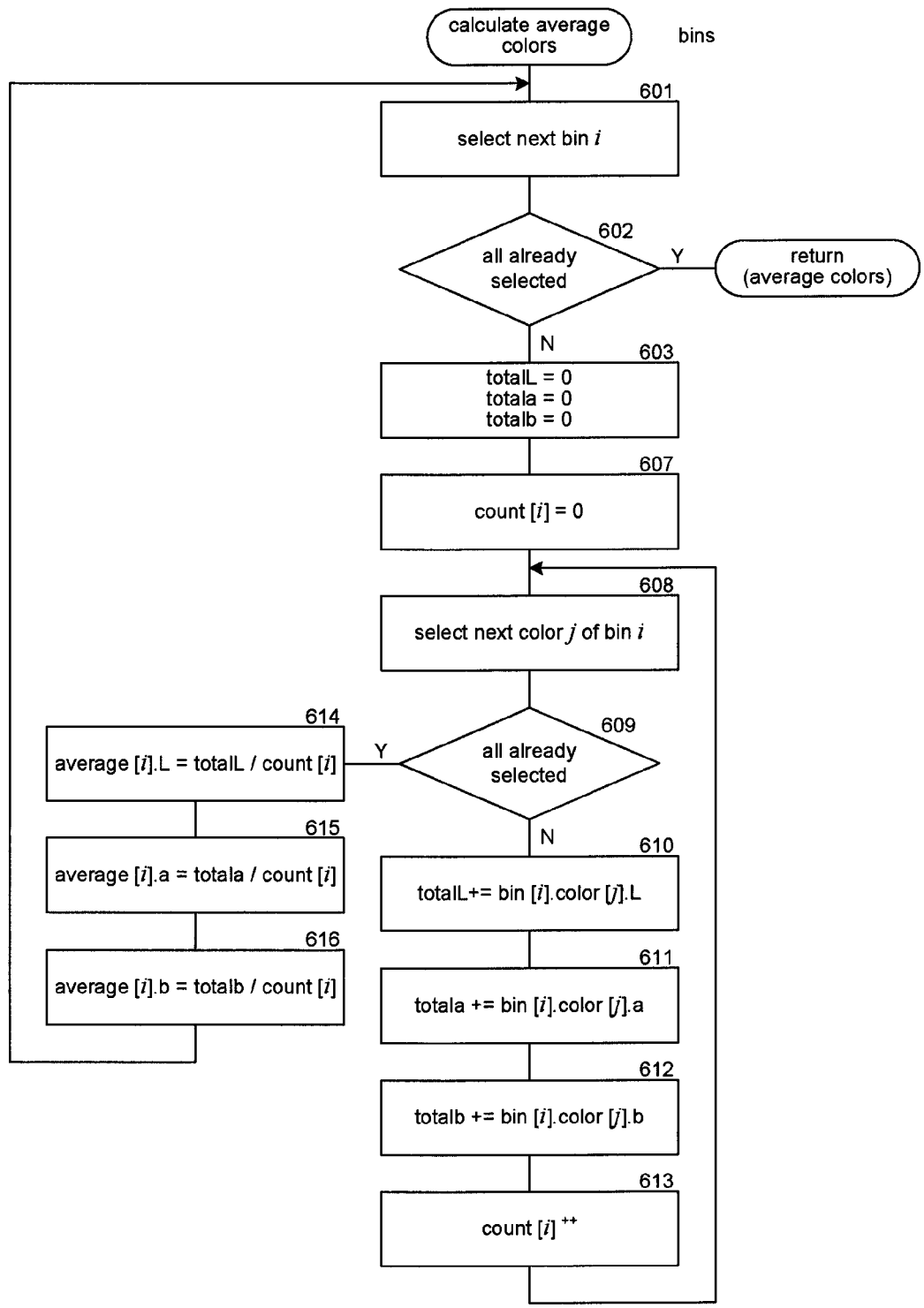
FIG. 6 is a flow diagram that illustrates the processing of the calculate average colors component of the dominant color system in one embodiment.

FIG. 6 is a flow diagram that illustrates the processing of the calculate average colors component of the dominant color system in one embodiment. The component is passed bins containing the colors of an image. The component loops calculating the average color of each bin and a count of the number of colors in each bin. In block 601, the component selects the next bin. In decision block 602, if all the bins have already been selected, then the component returns the average colors as the representative colors, else the component continues at block 603. In block 603, the component initializes a running total for each component of a color for the selected bin. In block 607, the component initializes a count of the number of colors in the selected bin. In blocks 608-613, the component accumulates a total of the values for each component within the selected bin. In block 608, the component selects the next color of the selected bin. In decision block 609, if all the colors of the selected bin have already been selected, then the component continues at block 614, else the component continues at block 610. In blocks 610-612, the component increments the total of the component values by the component values of the selected color. In block 613, the component increments the count of the number of colors in the selected bin and then loops to block 608 to select the next color of the selected bin. In blocks 614-616, the component calculates the average value of each component of the average color of the selected bin. The component then loops to block 601 to select the next bin.

Figure 7:
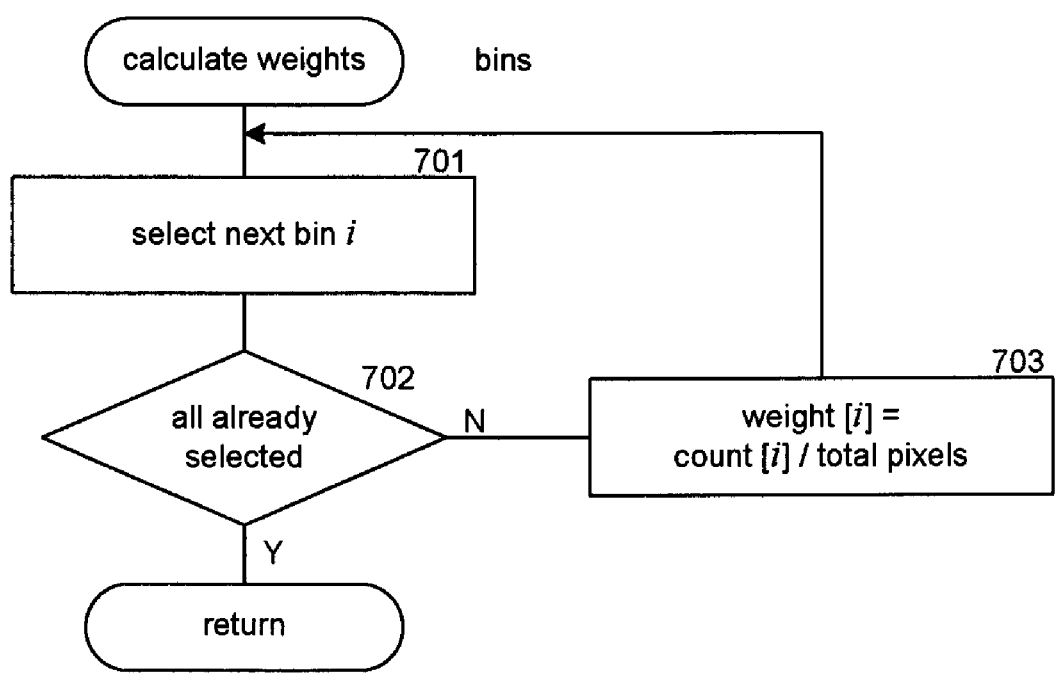
FIG. 7 is a flow diagram that illustrates the processing of the calculate weights component of the dominant color system in one embodiment.

FIG. 7 is a flow diagram that illustrates the processing of the calculate weights component of the dominant color system in one embodiment. The component is passed bins and calculates the weight of a bin as the percentage of colors within that bin to the total number of pixels. In block 701, the component selects the next bin. In decision block 702, if all the bins have already been selected, then the component returns, else the component continues at block 703. In block 703, the component calculates the weight for the selected bin and then loops to block 701 to select the next bin.

Figure 8:
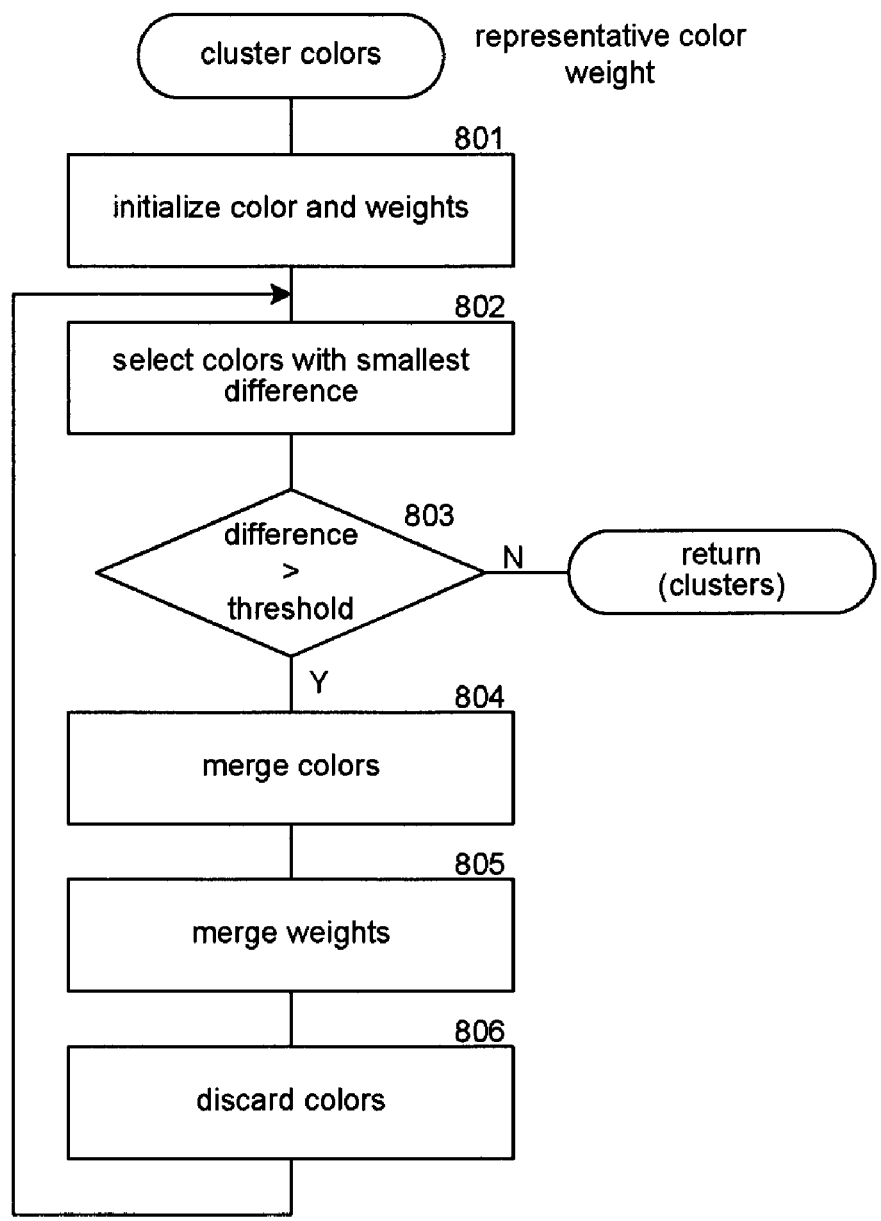
FIG. 8 is a flow diagram that illustrates the processing of the cluster colors component of the dominant color system in one embodiment.

FIG. 8 is a flow diagram that illustrates the processing of the cluster colors component of the dominant color system in one embodiment. The component is passed the representative colors and their weights and generates clusters of similar colors represented by a combined color and combined weight. In block 801, the component creates an initial cluster for each representative color and sets the weight of the cluster to the weight of the color. In block 802, the component selects the representative colors of the clusters with the smallest difference. In decision block 803, if the smallest difference is larger than a threshold, then the component returns the representative colors of the clusters that have been identified as candidate dominant colors, else the component continues at block 804. In block 804, the component combines the selected colors. In block 805, the component combines the weights of the selected colors. In block 806, the component discards the selected colors as clusters and generates a new cluster with the combined color and weight. The component then loops to block 802 to select the next color.

Figure 9:
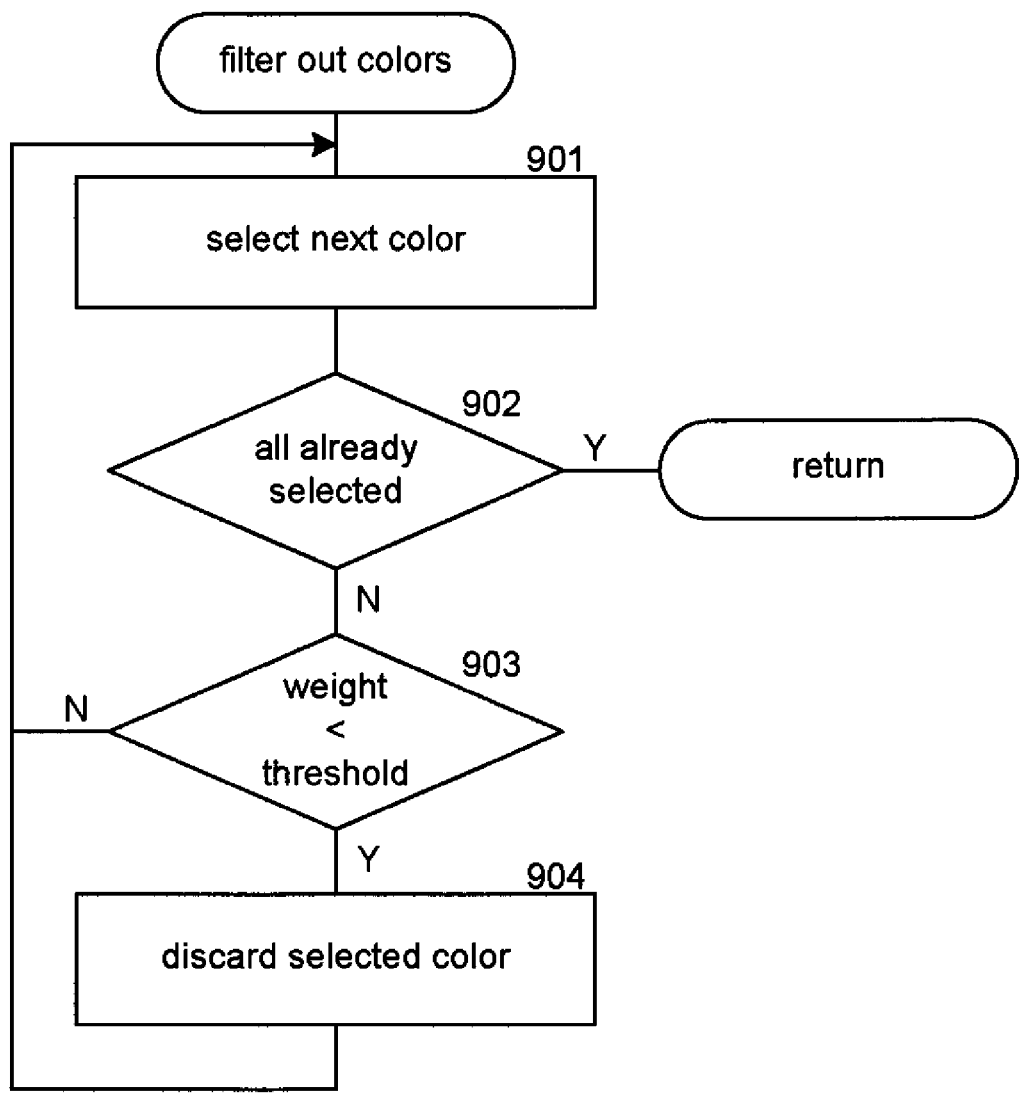
FIG. 9 is a flow diagram that illustrates the processing of the filter out colors component of the dominant color system in one embodiment.

FIG. 9 is a flow diagram that illustrates the processing of the filter out colors component of the dominant color system in one embodiment. The component is passed candidate dominant colors and filters out candidate dominant colors whose weights are too low. In block 901, the component selects the next candidate dominant color. In decision block 902, if all the candidate dominant colors have already been selected, then the component returns, else the component continues at block 903. In decision block 903, if the weight of the selected candidate color is less than a threshold, then the component continues at block 904, else the component continues at block 901 to select the next candidate dominant color. In block 904, the component discards the selected candidate dominant color and then loops to block 901 to select the next candidate dominant color.

Figure 10:
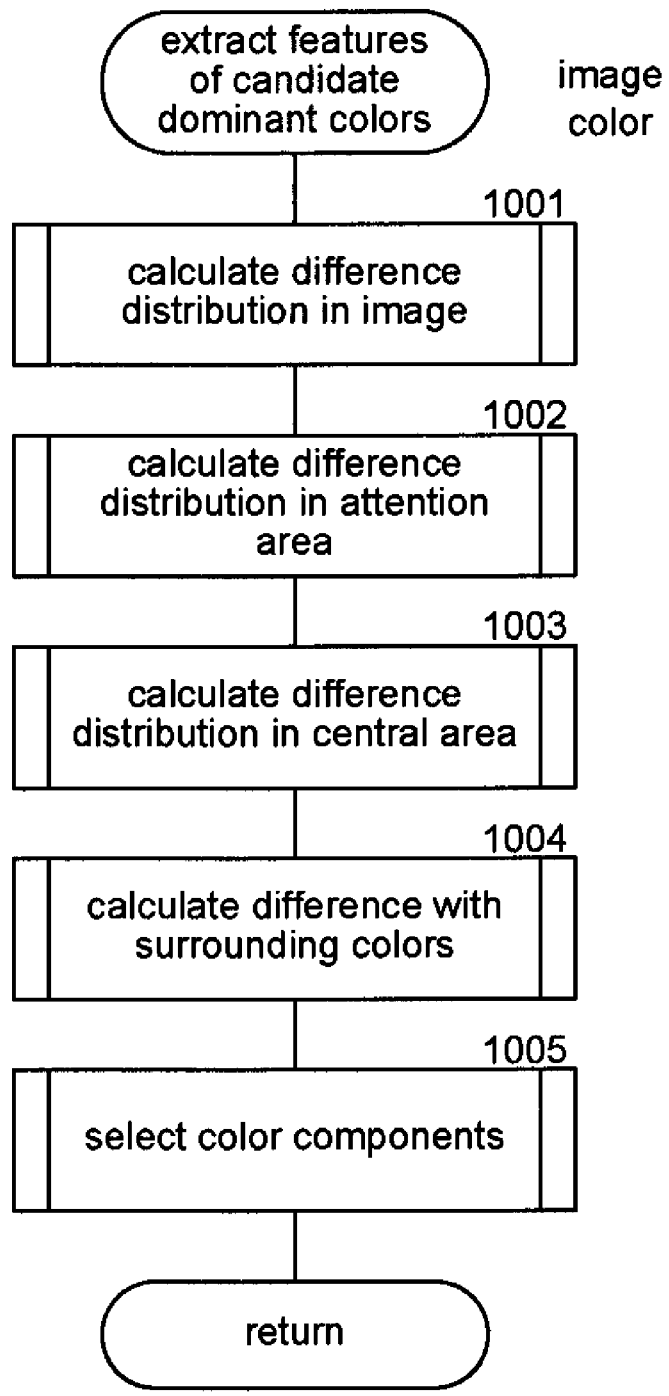
FIG. 10 is a flow diagram illustrating the processing of the extract features of candidate dominant colors component of the dominant color system in one embodiment.

FIG. 10 is a flow diagram illustrating the processing of the extract features of candidate dominant colors component of the dominant color system in one embodiment. The component is passed an image and a candidate dominant color and generates a 27-element feature vector for the candidate dominant color. The 27-element feature vector includes four six-dimension histograms and three color components. In block 1001, the component invokes the calculate difference distribution in image component to generate the histogram based on differences between the candidate dominant color and colors of the entire passed image. In block 1002, the component invokes the calculate difference distribution in attention area component to generate a histogram based on differences between the candidate dominant color and colors of an attention area of the passed image. In block 1003, the component invokes the calculate difference distribution in central area component to generate a histogram based on differences between the candidate dominant color and colors of a central area of the passed image. In block 1004, the component invokes the calculate difference with surrounding colors component to generate a histogram representing differences between colors similar to the candidate dominant color and neighboring colors. In block 1005, the component selects each color component as a feature element. The component then returns the feature vector.

Figure 11:
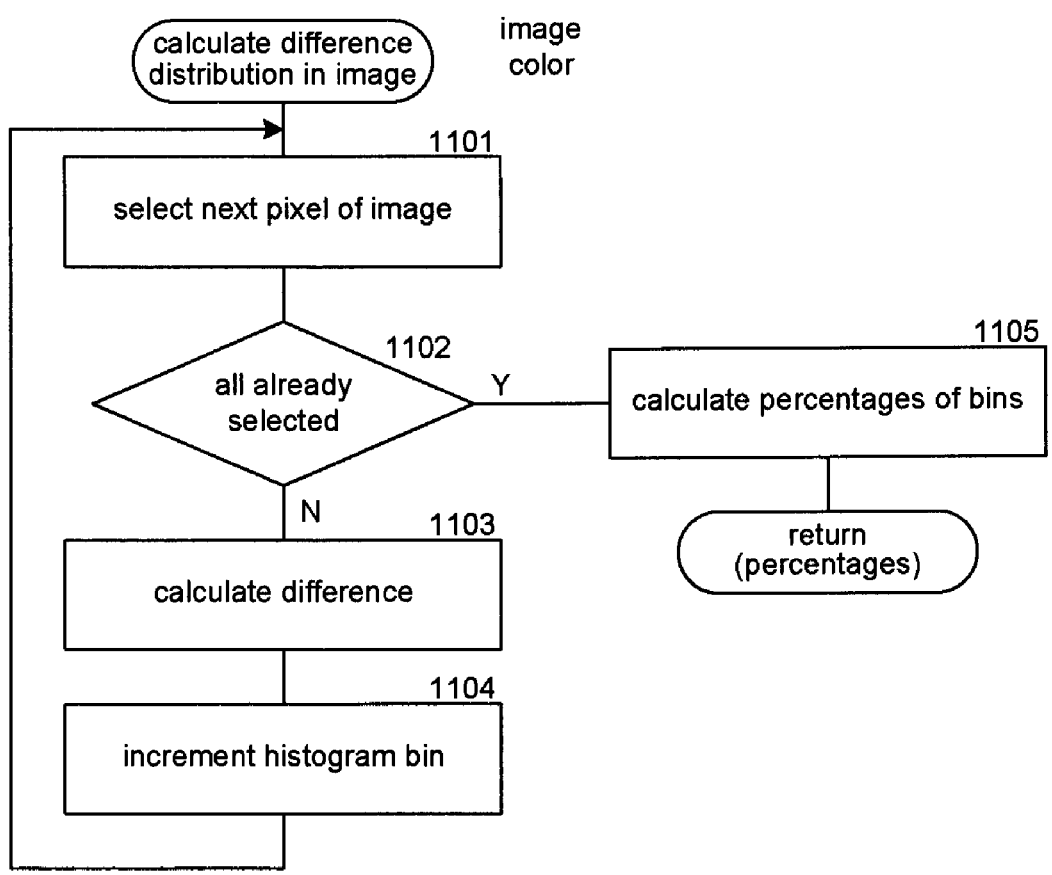
FIG. 11 is a flow diagram that illustrates the processing of the calculate difference distribution in image component of the dominant color system in one embodiment.

FIG. 11 is a flow diagram that illustrates the processing of the calculate difference distribution in image component of the dominant color system in one embodiment. The component is passed an image and a candidate dominant color and generates a histogram based on the difference distribution between colors of the entire passed image and the passed candidate dominant color. In block 1101, the component selects the next pixel of the passed image. In decision block 1102, if all the pixels have already been selected, then the component continues at block 1105, else the component continues at block 1103. In block 1103, the component calculates the difference between the color of the selected pixel and the passed candidate dominant color. In block 1104, the component increments the histogram bin associated with the calculated difference and then loops to block 1101 to select the next pixel of the passed image. In block 1105, the component calculates a percentage for each of the bins of the histogram. The component then returns the percentages as the generated histogram. The calculate difference distribution in attention area component and the calculate difference distribution in central area component are not separately illustrated, but operate in a similar manner except that they identify the attention area and central area and generate a histogram based on those areas rather than the entire image.

Figure 12:
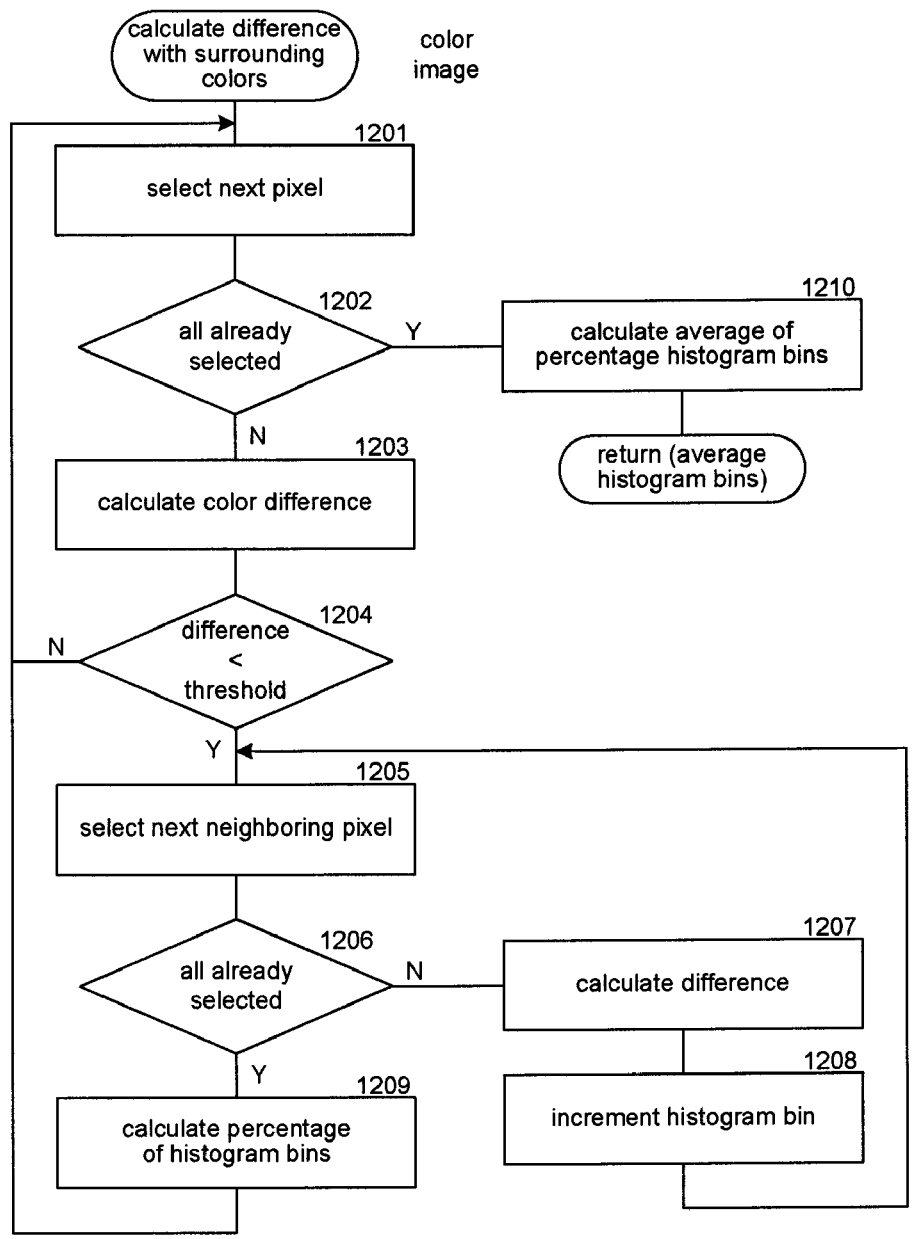
FIG. 12 is a flow diagram that illustrates the processing of the calculate difference with surrounding colors component of the dominant color system in one embodiment.

FIG. 12 is a flow diagram that illustrates the processing of the calculate difference with surrounding colors component of the dominant color system in one embodiment. The component is passed an image and a candidate dominant color and generates a histogram for that color. In block 1201, the component selects the next pixel of the passed image. In decision block 1202, if all the pixels have already been selected, then the component continues at block 1210, else the component continues at block 1203. In block 1203, the component calculates the difference in color between the color of the selected pixel and the passed candidate dominant color. In decision block 1204, if the difference is less than a threshold, then the color is not similar to the passed candidate dominant color and the component loops to block 1201 to select the next pixel, else the component continues at block 1205. In blocks 1205-1208, the component loops generating a count within histogram bins for the differences between the color of the selected pixel and the color of neighboring pixels. In block 1205, the component selects the next neighboring pixel. In decision block 1206, if all the neighboring pixels have already been selected, then the component continues at block 1209, else the component continues at block 1207. In block 1207, the component calculates the difference between the color of the selected pixel and the color of the selected neighboring pixel. In block 1208, the component increments the appropriate bin of the histogram based on the calculated difference. The component then loops to block 1205 to select the next neighboring pixel of the selected pixel. In block 1209, the component calculates the percentages for the histogram bins and then loops to block 1201 to select the next pixel of the passed image. In block 1210, the component calculates an average of the percentages of the histogram bins that were generated for each of the similar pixels. The component then returns the average histogram bins.

Figure 13:
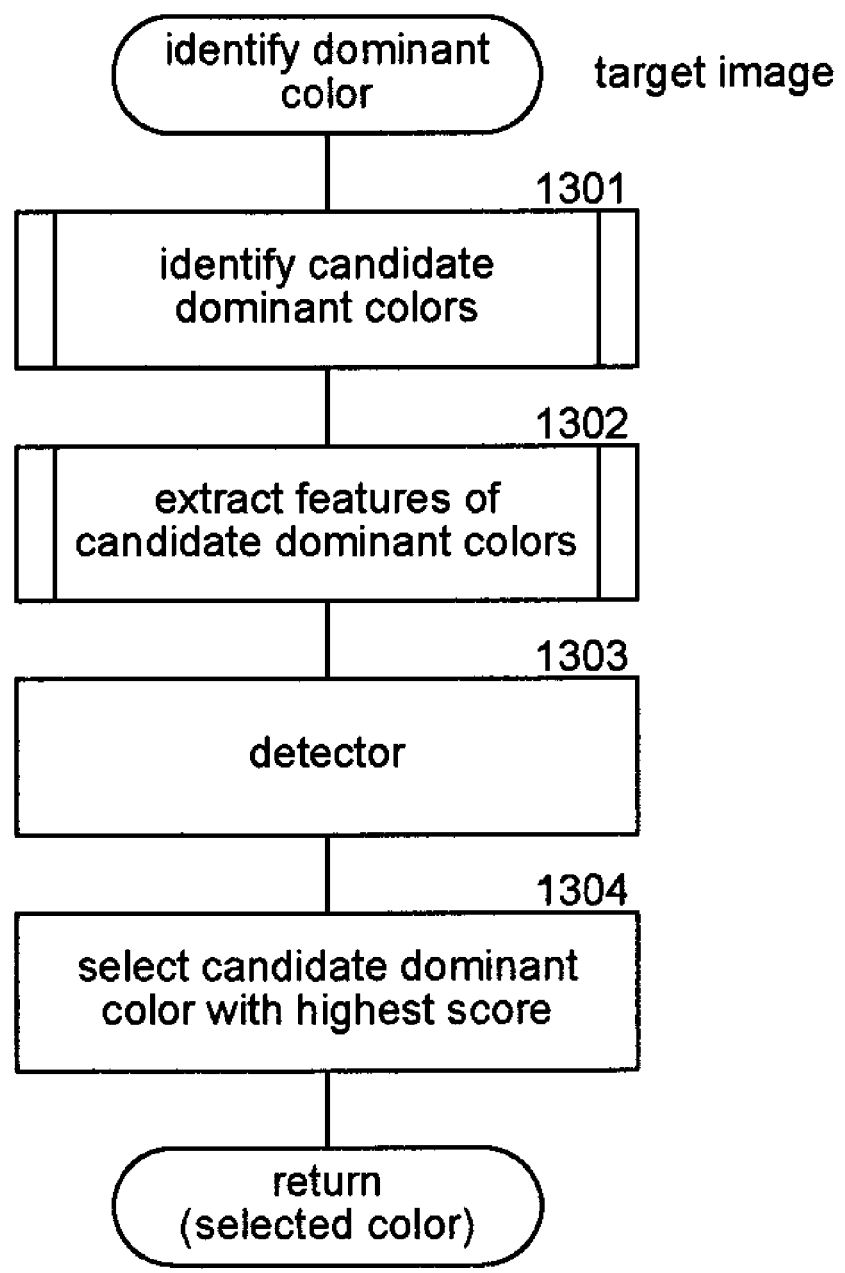
FIG. 13 is a flow diagram that illustrates the processing of the identify dominant color component of the dominant color system in one embodiment.

FIG. 13 is a flow diagram that illustrates the processing of the identify dominant color component of the dominant color system in one embodiment. This component is invoked by applications to determine the dominant color of images. The component is passed a target image and returns the dominant color. In block 1301, the component invokes the identify candidate dominant colors component to identify the candidate dominant colors of the target image. In block 1302, the component invokes the extract features of candidate dominant colors component to extract features for each candidate dominant color. In block 1303, the component invokes the detector generated by the dominant color system for each candidate dominant color. The component passes the features of each candidate dominant color and receives a score indicating dominance of the candidate dominant color in return. In block 1304, the component selects the candidate dominant color with the highest score and returns that color as the dominant color of the passed target image.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The dominant color system can be used to identify the dominant color of an image derived from a frame of a video or a sequence of frames of a video, derived from photographs, derived from computer-generated graphics, and so on. Accordingly, the invention is not limited except as by the appended claims.

We claim:

1. A method in a computing system for generating a detector to detect a dominant color of an image, the method comprising:
   providing a collection of training images;
   for each training image,
   identifying candidate dominant colors of the training image;
   extracting features of the candidate dominant colors of the training image; and
   inputting indications of dominance of the candidate dominant colors to the training image; and
   training a detector to detect a dominant color of the image using the extracted features and indications of dominance of the candidate dominant colors
   wherein the identifying of candidate dominant colors of the training image includes
   quantizing the colors of the training image into bins;
   calculating average colors of the bins;
   calculating weights of the bins; and
   clustering the average colors of the bins factoring in the weight of the bins, the clustered average colors representing the candidate dominant colors;
   wherein the clustering includes successively creating a combined color for a pair of colors whose difference is smallest; and
   wherein the combined color is a weighted combination of the pair of colors and has a combined weight derived from the weights of the pair of colors.

2. The method of claim 1 including filtering out clustered average colors based on their weights.

3. The method of claim 1 wherein the extracting of features of the candidate dominant colors of the training image includes extracting a feature based on difference between a candidate dominant color and colors of the training image.

4. The method of claim 3 wherein the difference is based on an area of the training image selected from a group consisting of an entire area, a central area, and an attention area.

5. The method of claim 1 wherein the extracting of features of the candidate dominant colors of the training image includes extracting a feature based on difference between a similar color of the training image that is similar to a candidate dominant color and colors of neighboring pixels of the pixel with the similar color.

6. The method of claim 1
   wherein the extracting of features of the candidate dominant colors of the training image includes extracting a feature based on difference between a candidate dominant color and colors of the training image; and including:
   identifying candidate dominant colors of a target image;
   extracting features of the target image; and detecting a dominant color of the target image by applying the detector to the extracted features of the target image.

7. A computing system that generates a detector to detect a dominant color of an image, comprising:
   a memory storing computer-executable instructions of
      an identify candidate dominant colors component that identifies candidate dominant colors of an image, the identify candidate dominant colors, component for:
         quantizing the colors of the image into bins;
         calculating average colors of the bins;
         calculating weights of the bins; and
         clustering the average colors of the bins factoring in the weight of the bins, the clustered average colors representing the candidate dominant colors, the clustering including successively creating a combined color for a pair of colors whose difference is smallest, the combined color being a weighted combination of the pair of colors and having a combined weight derived from the weights of the pair of colors;
      an extract features of candidate dominant colors component that extracts features of candidate dominant colors of an image;
      an input indications of dominance component that inputs indications of dominance of identified candidate colors; and
      a training component that trains a detector to detect a dominant color of an image using extracted features for candidate dominant colors of training images and indications of dominance of the candidate dominant colors of the training images; and
   a processor for executing the computer-executable instructions stored in the memory.

8. The computing system of claim 7 wherein the training component uses the identify candidate dominant colors component to identify candidate dominant colors of the training images, the extract features of candidate dominant colors component to extract features of the candidate dominant colors of the training images, and the input indications of dominance component to input indications of the dominance of the candidate dominant colors of the training images.

9. The computing system of claim 7 including:
   an identify dominant color component that identifies a dominant color of a target image by applying the detector to the extracted features of the target image.

10. The computing system of claim 7 including:
    an identify dominant color component that identifies a dominant color of a target image by using
       the identify candidate dominant colors component to identify candidate dominant colors of the target image;
       the extract features of candidate dominant colors component to extract features of candidate dominant colors of the target image; and
       the detector to detect a dominant color of the target image using the extracted features of the candidate dominant colors of the target image.

11. The computing system of claim 7 wherein the extract features of candidate dominant colors component extracts a feature based on difference between a candidate dominant color and colors of the training image.

12. The computing system of claim 11 wherein the difference is based on an area of the training image selected from a group consisting of an entire area, a central area, and an attention area.

13. A computer-readable medium, which the medium is not a signal containing instructions for controlling a computing system to identify a dominant color of a target image, by a method comprising:
    identifying candidate dominant colors of the target image;
    extracting features of the candidate dominant colors of the target image; and
    detecting a dominant color of the target image by applying a detector to the extracted features of the candidate dominant colors, the detector to be generated by
    identifying candidate dominant colors of training images, the identifying including:
       quantizing the colors of the image into bins;
       calculating average colors of the bins;
       calculating weights of the bins; and
       clustering the average colors of the bins factoring in the weight of the bins, the clustered average colors representing the candidate dominant colors, the clustering including successively creating a combined, color for a pair of colors whose difference is smallest, the combined color being a weighted combination of the pair of colors and having a combined weight derived from the weights of the pair of colors;
    extracting features of the candidate dominant colors of the training images;
    receiving indications of dominance of the candidate dominant colors of the training images; and
    training the detector to detect a dominant color of an image using the extracted features and indications of dominance of the candidate dominant colors of the training images.

14. The computer-readable medium of claim 13 wherein the extracting of features of the candidate dominant colors includes extracting a feature based on difference between a candidate dominant color and colors of an image.

* * * * *